United States Patent
Dauner et al.

(10) Patent No.: US 10,071,505 B2
(45) Date of Patent: Sep. 11, 2018

(54) METHOD FOR PRODUCING A SEMI-FINISHED PRODUCT TO BE MADE INTO A CFRP COMPONENT, FROM CARBON-FIBER SCRAP

(71) Applicant: Bayerische Motoren Werke Aktiengesellschaft, Munich (DE)

(72) Inventors: Willy Dauner, Gersthofen (DE); Stephan Huber, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 234 days.

(21) Appl. No.: 15/090,718

(22) Filed: Apr. 5, 2016

(65) Prior Publication Data
US 2016/0214278 A1    Jul. 28, 2016

Related U.S. Application Data

(63) Continuation of application No. PCT/EP2014/073045, filed on Oct. 28, 2014.

(30) Foreign Application Priority Data

Nov. 5, 2013    (DE) .................. 10 2013 222 426

(51) Int. Cl.
*B29B 11/16*    (2006.01)
*B29B 11/10*    (2006.01)
(Continued)

(52) U.S. Cl.
CPC .............. *B29B 11/16* (2013.01); *B29B 11/10* (2013.01); *B29B 17/0042* (2013.01);
(Continued)

(58) Field of Classification Search
CPC ............ B29C 47/0066; B29C 47/0004; B29C 47/1081; B29C 47/0019; B29C 2793/00;
(Continued)

(56) References Cited

U.S. PATENT DOCUMENTS

| 4,103,385 A | * | 8/1978 | Porter | ...................... C08J 7/047 |
|---|---|---|---|---|
| | | | | 15/250.48 |
| 5,401,154 A | | 3/1995 | Sargent | |

(Continued)

FOREIGN PATENT DOCUMENTS

| CN | 101889045 A | 11/2010 |
|---|---|---|
| CN | 102550603 A | 7/2012 |

(Continued)

OTHER PUBLICATIONS

International Search Report (PCT/ISA/210) issued in PCT Application No. PCT/EP2014/073045 dated Feb. 19, 2015 with English-language translation (six (6) pages).
(Continued)

*Primary Examiner* — Nahida Sultana
(74) *Attorney, Agent, or Firm* — Crowell & Moring LLP

(57) ABSTRACT

A method is provided in which suitable carbon-fiber scrap is fed, together with a plastic polymer, to a pulverizer and extruder in order to produce a carbon-fiber polymer mass therefrom and to impregnate the mass with a resin. A regrind prepreg, which is given suitable forms and/or lengths, is thus obtained. The regrind prepregs thus obtained can then be given an approximately final form in an additional step by way of an extrusion process.

14 Claims, 1 Drawing Sheet

(51) Int. Cl.
*B29B 17/04* (2006.01)
*B29C 47/00* (2006.01)
*B29C 47/04* (2006.01)
*B29C 47/10* (2006.01)
*B29B 17/00* (2006.01)
*B29K 105/06* (2006.01)
*B29K 307/04* (2006.01)
*B29K 101/12* (2006.01)
*B29K 105/08* (2006.01)

(52) U.S. Cl.
CPC ...... *B29B 17/0412* (2013.01); *B29C 47/0004* (2013.01); *B29C 47/0066* (2013.01); *B29C 47/04* (2013.01); *B29C 47/1045* (2013.01); *B29C 47/1081* (2013.01); *B29C 47/004* (2013.01); *B29C 47/0019* (2013.01); *B29C 2793/009* (2013.01); *B29K 2101/12* (2013.01); *B29K 2105/06* (2013.01); *B29K 2105/0872* (2013.01); *B29K 2307/04* (2013.01); *Y02W 30/62* (2015.05)

(58) Field of Classification Search
CPC ..... B29B 11/16; B29B 11/10; B29B 17/0412; B29B 17/0042; B29K 2105/0872; B29K 2105/06; B29K 2101/12
See application file for complete search history.

(56) References Cited

U.S. PATENT DOCUMENTS

| | | | |
|---|---|---|---|
| 6,436,322 B1 | 8/2002 | Fredl | |
| 2006/0029775 A1* | 2/2006 | MacKinnon | B32B 27/12 428/141 |
| 2007/0181855 A1* | 8/2007 | Nagao | C08J 3/201 252/500 |
| 2008/0039574 A1* | 2/2008 | Nagao | C08K 7/06 524/496 |
| 2010/0148384 A1* | 6/2010 | Jenkins | B29D 11/00269 264/1.29 |
| 2010/0267868 A1 | 10/2010 | Takahashi et al. | |
| 2011/0171403 A1* | 7/2011 | Tabata | C08F 114/26 428/35.5 |
| 2012/0091615 A1* | 4/2012 | Wenzel | B29C 43/003 264/105 |
| 2014/0287176 A1* | 9/2014 | Galloway | C08J 3/201 428/36.4 |
| 2014/0296414 A1* | 10/2014 | Hattori | C08J 5/042 524/495 |
| 2015/0315364 A1* | 11/2015 | Ohtani | C08J 5/06 524/495 |
| 2018/0002512 A9* | 1/2018 | Galloway | C08K 7/24 |

FOREIGN PATENT DOCUMENTS

| | | |
|---|---|---|
| DE | 195 14 543 C1 | 3/1996 |
| DE | 195 07 070 A1 | 9/1996 |
| DE | 197 10 098 A1 | 9/1998 |
| DE | 102 11 920 A1 | 10/2003 |
| DE | 10 2011 115 966 A1 | 4/2013 |
| EP | 0 535 650 A2 | 4/1993 |
| EP | 2 233 517 A1 | 9/2010 |
| WO | WO 03/078143 A1 | 9/2003 |
| WO | WO-2013080820 A1 * | 6/2013 ............. C08J 5/042 |

OTHER PUBLICATIONS

German-language Written Opinion (PCT/ISA/237) issued in PCT Application No. PCT/EP2014/073045 dated Feb. 19, 2015 (five (5) pages).

German Search Report issued in counterpart German Application No. 10 2013 222 426.5 dated Feb. 10, 2014 with partial English-language translation (ten (10) pages).

Chinese Office Action issued in counterpart Chinese Application No. 201480035251.1 dated Aug. 1, 2016 with English translation (15 pages).

* cited by examiner

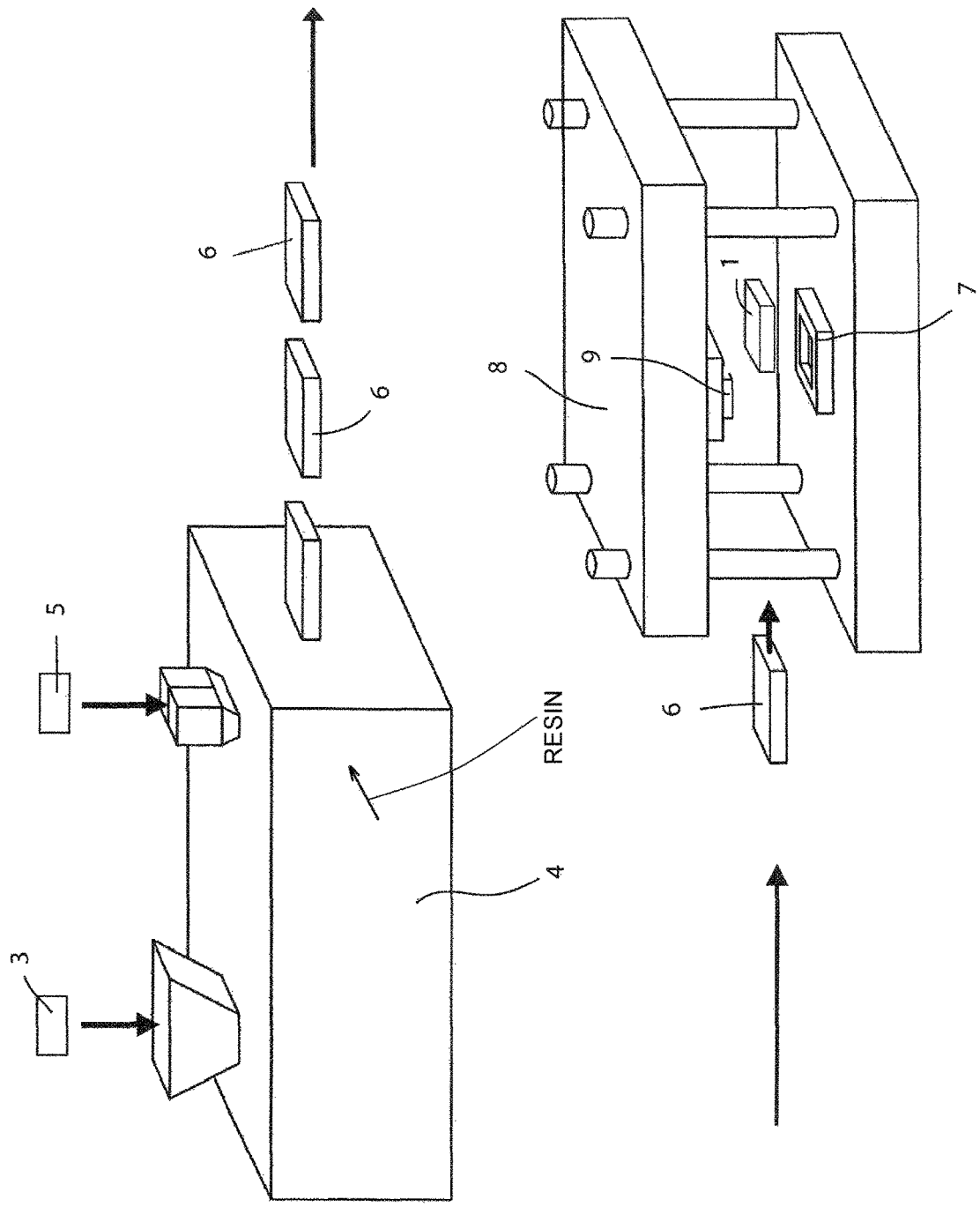

METHOD FOR PRODUCING A SEMI-FINISHED PRODUCT TO BE MADE INTO A CFRP COMPONENT, FROM CARBON-FIBER SCRAP

CROSS REFERENCE TO RELATED APPLICATIONS

This application is a continuation of PCT International Application No. PCT/EP2014/073045, filed Oct. 28, 2014, which claims priority under 35 U.S.C. § 119 from German Patent Application No. 10 2013 222 426.5, filed Nov. 5, 2013, the entire disclosures of which are herein expressly incorporated by reference.

BACKGROUND AND SUMMARY OF THE INVENTION

The invention relates to a method for producing a semi-finished product to be made into a CFRP component (carbon-fiber reinforced component). The invention relates, in particular, to a continuous method for producing a CFRP component in which the production of a regrind semi-finished product is one intermediate step.

In the prior art, it is known how to subject plastics to a regrind process in order to recycle them in a subsequent reprocessing process. Thus, e.g., a method is disclosed in DE 19710098 A1 for producing polyethylene terephthalate (PET) regrind from flakes, as well as a PET product produced by the method. PET products find multiple uses, for example as bottles, qualified films and fibers, medical devices, especially medical syringes and medical containers. One tries to utilize the products as much as possible in the material cycle. However, a major problem here is that the quality of the products changes with an increasing proportion of PET regrind.

Molded parts of polymer materials, which are used in particular in motor vehicle interiors, need to meet high mechanical and environmental requirements and, in particular, they must satisfy requirements in terms of their mechanical properties, their surface properties, their aging as well as their odor and emission behavior. It is known how to use various polymer materials for the manufacture of components and molded parts for motor vehicle interiors. A typically used material is a fiberglass-reinforced ABS/PC material (polymer blend of acrylic-butadiene/styrene copolymer and polycarbonate). However, this material has insufficient UV stability, poor flowing behavior, a poor thermal aging behavior (toughness and elongation at break following hot storage) and unfavorable surface properties, as well as poor foam adhesion and, in particular, a poor odor behavior. By odor behavior of plastics is meant the tendency for the parts to give off volatile components which can be perceived by a person after climate testing and especially a temperature exposure of fixed duration and fixed temperature.

Moreover, it is known in the prior art how to use fiber-reinforced molded plastics for mechanically stable components and molded parts. The reinforcement fibers used in the manufacture of structural parts are, for example, glass fibers, natural fibers or carbon fibers and fillers. However, fiber materials such as glass fibers are expensive. Another drawback of glass fibers is that they are relatively heavy.

Extrusion, co-extrusion and pultrusion methods are used in the prior art for the manufacture of components such as vehicle parts and vehicle interior parts, for example, especially in the manufacture of profiles. However, the high costs still remain a limiting factor. The manufacture of carbon fiber-reinforced components with such methods is therefore significantly influenced by the material costs and the quantity of fibers used. Moreover, it is known how to use carbon fiber scrap during manufacturing, especially during the manufacturing of fleeces, in order to lower the costs. But the processing methods known in the prior art are limited by discontinuous methods. Thus, each time definite batch amounts are processed in the discontinuous process.

It is therefore desirable to provide a production method which works continuously and with which larger quantities of duroplastics or thermoplastics can be processed.

Therefore, the problem which the present invention proposes to solve is to overcome the aforementioned drawbacks and, in particular, to provide a continuous method with short process times which enables an economical production of semi-finished products and components of polymer materials with good final mechanical properties.

This problem is solved by a method for manufacturing a semi-finished product in a continuous process to be made into a carbon fiber-reinforced component, wherein the method includes the following steps: a. feeding carbon fiber scrap into an extruder; b. adding a plastic polymer to the extruder; c. pulverizing the carbon fiber scrap and blending the pulverized scrap with the plastic polymer to form a polymer mass; and d. impregnating the polymer mass with a resin in order to form a regrind prepreg from it, which is given suitable forms and/or lengths.

The basic notion of the invention is to feed suitable carbon fiber scrap together with a plastic polymer to a pulverizer and extruder in order to generate from this a carbon fiber polymer mass and to impregnate the polymer mass in a resin. From this one obtains a regrind prepreg, which is placed in suitable shapes and/or given suitable lengths. These regrind prepregs can then be given an approximately final form in an additional sub-step by way of extrusion processes.

An extrusion, co-extrusion or pultrusion method or the like can be used for this in order to make molded parts such as profiles or vehicle interior parts.

In a general form of the invention, therefore, a method is provided for the manufacture of a semi-finished product in a continuous process for processing into a carbon fiber-reinforced component with at least the following steps:
feeding of carbon fiber scrap into an extruder;
adding of a plastic polymer to the extruder;
pulverization of the carbon fiber scrap and blending of the pulverized scrap with the plastic polymer to form a polymer mass;
impregnating of the polymer mass with a resin in order to form a regrind prepreg from it, which regrind prepreg is placed in suitable forms and/or lengths.

Accordingly, one aspect of the invention consists in mechanically pulverizing carbon fiber-reinforced plastic scrap or carbon fiber-reinforced plastic materials in an extruder, so that a carbon fiber regrind is produced therefrom, and then to blend this with a duroplastic or thermoplastic in a desired mix ratio to form a polymer mass. The mix ratio and the carbon fiber scrap size has an influence on the desired mechanical and technical properties of the later molded part. The degree of pulverization can preferably be adjusted by way of the screw geometry or the screw length of the extruder.

Preferably, a method is proposed in which either a thermoplastic or a duroplastic is used as the plastic polymer.

In an especially preferred embodiment of the invention, the pulverization of carbon fiber scrap or carbon fiber waste fed into the extruder occurs directly in the extruder. In this way, a cost-intensive prepulverization and thus a separate process step can be avoided. In one preferred embodiment, accordingly, an extruder is used for the pulverization of the carbon fiber scrap that has a screw geometry adapted to the desired degree of pulverization. The degree of pulverization can be adjusted, for example, in terms of the screw length or the shape of the screw geometry.

Alternatively, a pulverization device can also be arranged in the extruder so that when the extruder screw is activated the pulverization occurs at the same time via the pulverization device.

In one preferred embodiment of the invention, the extruded polymer mass is impregnated with a resin in order to form a regrind prepreg from this, which can be placed in suitable forms and/or lengths. Moreover, it is accordingly preferred in a sub-step following the extrusion to cut the regrind prepreg to length at defined intervals after leaving the extruder, i.e., to cut suitable prepreg pieces for further processing. Alternatively, the regrind prepreg after leaving the extruder can also be placed in a defined form.

In another preferred embodiment of the invention it is provided that the regrind prepreg cut to length or placed in form is reshaped into an approximately final semi-finished product by way of pressure shaping, such as extrusion in a die.

It is especially advantageous for the regrind prepreg to be fed to a shaping cavity of a pressing die for the pressure shaping and to be pressed by way of a pressing punch. According to the invention, the aforementioned sub-steps can be connected in a continuous conveyor belt process or connected in series in a production line.

Other objects, advantages and novel features of the present invention will become apparent from the following detailed description of one or more preferred embodiments when considered in conjunction with the accompanying drawing.

BRIEF DESCRIPTION OF THE DRAWING

FIG. 1 is a schematic view of the method according to an embodiment of the invention for production of regrind prepregs for CFRP components.

DETAILED DESCRIPTION OF THE DRAWING

FIG. 1 shows the schematic sequence of steps of an exemplary method according to the invention for the production of a CFRP component (2) by use of an extruder (4) in an extrusion process and a following pressure reshaping process.

The method according to this sample embodiment occurs in a continuous process with the following steps.

At first, carbon fiber scrap (3) is fed to an extruder (4). In the extruder (4), the carbon fiber scrap (3) is pulverized by means of the extruder screw. Moreover, a plastic polymer (5) is added to the extruder (4).

The feeding of the carbon fiber scrap (3) and the plastic polymer (5) to the extruder (4) occurs in each case through feeding devices (10), which are in direct connection with the extruder screw.

By means of pulverization of the carbon fiber scrap (3) and blending of the pulverized scrap with the plastic polymer, a polymer mass is created. The polymer mass is impregnated with a resin in order to form a regrind prepreg (6) therefrom, which is placed in suitable forms and/or lengths.

The regrind prepreg (6) as can be seen in FIG. 1 has been cut to length at definite intervals after leaving the extruder (4) to form individual separate regrind prepregs (6). Merely as an example, four formed regrind prepregs (6) are shown in the production direction. A thermoplastic or a duroplastic can be used in the method as the plastic polymer (5).

The pulverization of the carbon fiber scrap (3) occurs directly in the extruder (4). In the present sample embodiment, an extruder (4) is used to pulverize the carbon fiber scrap (3) that has a screw geometry adapted to the desired degree of pulverization.

According to the invention, an adjustment and adaptation mechanism can also be provided so that a pulverization device and the screw conveyor can work together in an adjustable manner and thereby set the desired degree of pulverization in a suitable manner.

The sample embodiment of the method is furthermore configured so that the regrind prepregs (6) cut to length and formed are reshaped into an approximately final semi-finished product by way of extrusion in a die (8). This occurs by being fed to a shaping cavity (7) of a pressing die (8) and being pressed by way of a pressing punch (9). After the extrusion, the semi-finished product (1) hardens in the die (8) and is stripped from the die after hardening.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for manufacturing a semi-finished product, the semi-finished product to be made into a carbon fiber-reinforced component, the method comprising the steps of:
    feeding carbon fiber scrap into an extruder;
    adding a plastic polymer to the extruder;
    pulverizing the carbon fiber scrap and blending the pulverized scrap with the plastic polymer to form a polymer mass;
    impregnating the polymer mass formed with a resin in order to form a regrind prepreg;
    cutting the regrind prepreg to suitable lengths after the regrind prepreg exits the extruder to produce a cut prepreg;
    extruding the cut prepreg to reshape the cut regrind prepreg into the semi-finished product; and
    wherein the feeding, adding, pulverizing, impregnating, cutting, and extruding acts are performed in a continuous process.

2. The method according to claim 1, wherein the plastic polymer is a thermoplastic.

3. The method according to claim 1, wherein the plastic polymer is a duroplastic.

4. The method according to claim 1, wherein the pulverizing of the carbon fiber scrap occurs directly in the extruder.

5. The method according to claim 2, wherein the pulverizing of the carbon fiber scrap occurs directly in the extruder.

6. The method according to claim 3, wherein the pulverizing of the carbon fiber scrap occurs directly in the extruder.

7. The method according to claim 4, wherein the extruder used for the pulverization of the carbon fiber scrap has a screw geometry adapted to a desired degree of pulverization.

8. The method according to claim 1, wherein the suitable lengths are given lengths at defined intervals.

9. The method according to claim 1, wherein the cut regrind prepreg after exiting the extruder is placed in a shaping cavity for extruding the cut regrind prepreg.

10. The method according to claim 8, wherein the cut regrind prepreg after exiting the extruder is placed in a shaping cavity for extruding the cut regrind prepreg.

11. The method according to claim 1, wherein extruding the cut regrind prepreg is performed in a die.

12. The method according to claim 11, wherein the die is a pressing die, and the cut regrind prepreg is fed to a shaping cavity of the pressing die for extrusion and is pressed via a pressing punch.

13. The method according to claim 11, wherein the semi-finished product is hardened in the die after extrusion.

14. The method according to claim 12, wherein the semi-finished product is hardened in the die after the extrusion.

\* \* \* \* \*